United States Patent
Irving et al.

(10) Patent No.: US 7,934,430 B2
(45) Date of Patent: May 3, 2011

(54) DIE SCALE STRAIN GAUGE

(75) Inventors: Scott Irving, Cape Elizabeth, ME (US); Yong Liu, Scarborough, ME (US); Timwah Luk, Falmouth, ME (US)

(73) Assignee: Fairchild Semiconductor Corporation, South Portland, ME (US)

( * ) Notice: Subject to any disclaimer, the term of this patent is extended or adjusted under 35 U.S.C. 154(b) by 45 days.

(21) Appl. No.: 11/933,650

(22) Filed: Nov. 1, 2007

(65) Prior Publication Data

US 2009/0114030 A1 May 7, 2009

(51) Int. Cl.
*G01N 3/00* (2006.01)
(52) U.S. Cl. .......................................................... 73/795
(58) Field of Classification Search ....................... 73/795
See application file for complete search history.

(56) References Cited

U.S. PATENT DOCUMENTS

| | | | | |
|---|---|---|---|---|
| 4,198,868 A | * | 4/1980 | Runyan | 73/708 |
| 4,287,772 A | * | 9/1981 | Mounteer et al. | 73/720 |
| 4,462,018 A | * | 7/1984 | Yang et al. | 338/3 |
| 4,618,397 A | * | 10/1986 | Shimizu et al. | 438/53 |
| 5,324,326 A | * | 6/1994 | Lubin | 607/122 |
| 5,719,069 A | * | 2/1998 | Sparks | 438/50 |
| 6,186,009 B1 | * | 2/2001 | Miyano et al. | 73/756 |
| 6,341,528 B1 | * | 1/2002 | Hoffman et al. | 73/777 |
| 7,478,108 B2 | * | 1/2009 | Townsend et al. | 707/104.1 |
| 7,540,198 B2 | * | 6/2009 | Ichikawa | 73/754 |

* cited by examiner

*Primary Examiner* — Lisa M Caputo
*Assistant Examiner* — Octavia Davis
(74) *Attorney, Agent, or Firm* — Cesari and McKenna, LLP

(57) ABSTRACT

A chip with resistive, metallic strain gauges distributed on surfaces on and buried within the chip. Also, vertically arranged vias and vertical thin film resistive strain gauges are described. The resistive strain gauges can be multiplexed wherein strain can be measured across the topology of the chip in each of the top, bottom and buried layers and any vertical strain. The resistive strain gauges may be in serpentine patterns and may be arranged on via or on vertical edges of grooves that extend from an upper or lower surface of the chip to buried layers. In this fashion, the distributed strain gauges may be used to map the strain throughout the body of a chip. A Kelvin bridge may be used to measure the strain, but other such measuring techniques and devices may be used.

10 Claims, 5 Drawing Sheets

US 7,934,430 B2

DIE SCALE STRAIN GAUGE

BACKGROUND OF THE INVENTION

1. Field of the Invention

The present application relates to a method and apparatus for measuring and mapping strain on an integrated circuit die, and more particularly to using strain gauges that correlate resistance changes to strain at the die level.

2. Background Information

A significant failure mode in integrated circuit chips stems from strains generated during the fabrication of the chip and by environmental conditions including internally generated heat. The strains may damage the chips. Measuring strain at the chip level during chip fabrication may suggest changes to the chip fabrication processes to reduce the strain and improve the production yield.

Use of strain gauges is well known in the art for measuring strains on surfaces. They are used by fixing or bonding the strain gauge to the article, and using the strain gauge as one or more legs in a Wheatstone Bridge or equivalent circuit. As stresses on the article cause it to distort or change its physical shape, the attached strain gauge changes its physical dimensions and thus its resistance. The bridge detector senses the change in resistance. The resistance change of the strain gauge is correlated to strains in the surface. These prior art strain gauges are usually made of metal foils, but are not suitable for measuring strains at the integrated circuit die level.

Herein chip, integrated circuit and die may be used interchangeably and define the "chip" with respect to the IC package containing the chip.

Others have developed Moire interferometry that can detect and measure distortion or warpage of an integrated circuit package, but such techniques cannot be used to measure the chip itself, since it is hidden within the package.

At the integrated circuit die level, others have suggested strain measuring devices using piezo-electric material where an electrical output is generated by physical strains on a crystal. Such strain gauges are unwieldy and difficult to use on a die.

Still others have used standard type diffusions (that are used to fabricate electronic circuits on a chip) to form elements to measure strain on a chip. However, the use of diffusions typically include forming pn junctions. Such junctions may form complex circuitry from intrinsic electronic components (diodes, transistors, capacitors) that may adversely affect strain measurements. Using diffusions also entails construction as complex as fabricating a full integrated circuit, e.g. a circuit that might be used in a digital processor or the like. Another limitation of such semiconductor strain gauges is that they cannot be easily arranged to measure vertical strain of an integrated circuit. Vertical here meaning the direction of depth into a chip as compared to the x-y surface of the chip.

The known prior art present limitations where traditional strain gauges are simply not suitable for application to integrated circuit dies or they are more complex to fabricate and use.

It would advantageous to provide strain mapping over the top and lower surfaces of a chip during fabrication and in a specific application environment.

SUMMARY OF THE INVENTION

The present invention provides a strain gauge measuring system employing resistive, metallic runs distributed in a serpentine pattern on a chip. The runs may be on the top layer and any buried layer and may be distributed in order to map the strain throughout an integrated circuit chip.

In an illustrative example, the strain gauge system may be operated as one or more legs in a resistance measuring bridge where the other resistances required by the bridge are off the chip. However, in other illustrative examples the other resistors may be fashioned on or in the chip.

Measuring electronics, e.g. differential amplifiers, etc., may be supplied external with respect to the chip. However, as with the bridge resistors mentioned above, the differential measuring electronics, for example, may be formed on the chip with the resistive strain gauge runs.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
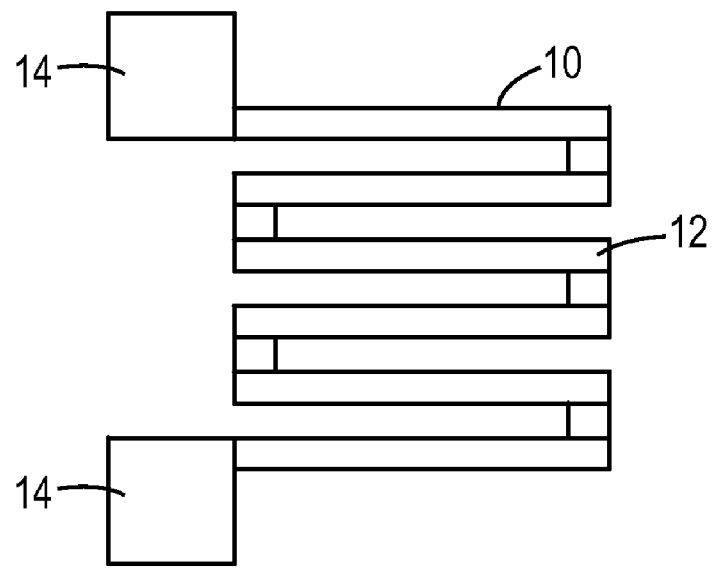
FIG. 1 is a layout of an illustrative metal strain gauge deposited in a serpentine pattern consistent with the present invention.

FIG. 1 is an illustrative arrangement of a serpentine pattern 10 of a deposited resistive material 12 on the surface of a chip that may be used as a strain gauge. Larger pads 14 may be used for making electrical connections. Depositing a resistive material, usually a metal, is sometimes referred to as "metallization", and is precisely controlled using current photolithographic deposition techniques. The width can be small and the length large to detect very small strains. As well known in the art, as the chip expands, say due to thermal conditions, the resistive element elongates. The length increases and the width decreases and the resistance of the element therefore increases. This is due to well known relationships. As mentioned before, it is noteworthy that this embodiment uses the change in resistance of a deposited metal or metal-like material and does not use semiconductor elements created by typical semiconductor processes, e.g. grown, diffused, etc. A deposited metal is simpler, less costly, easier to handle and does not entail the intrinsic electronic components found within typical integrated circuits. The strain gauge runs include small capacitances that do not substantially interfere with subsequent resistance measurements.

Figure 2:
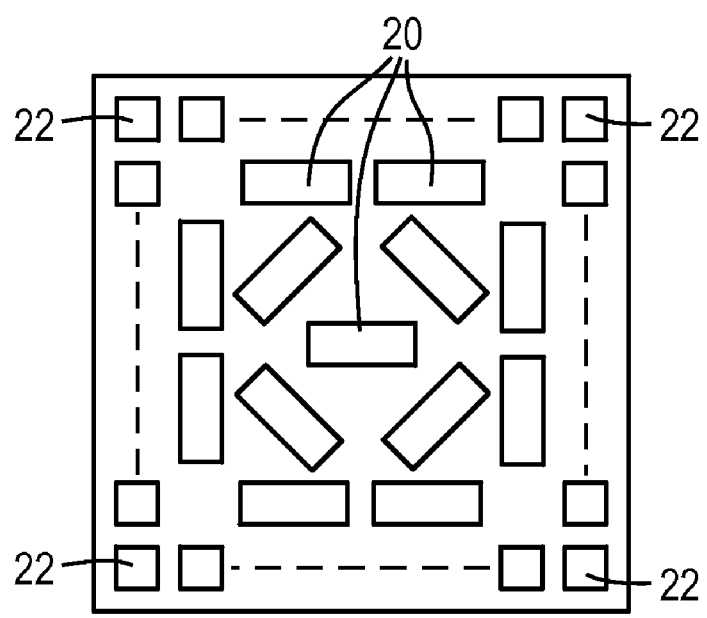
FIG. 2 is a top view of a chip with strain gauges.

FIG. 2 is one possible layout of deposited strain gauges 20 viewed from above a chip. The pads 22 around the periphery illustrate electrical contact pads. As shown the location of the strain gauges will allow measurements to be made over the entire surface of the chip, allowing the surface to be strain mapped.

Figure 3A:
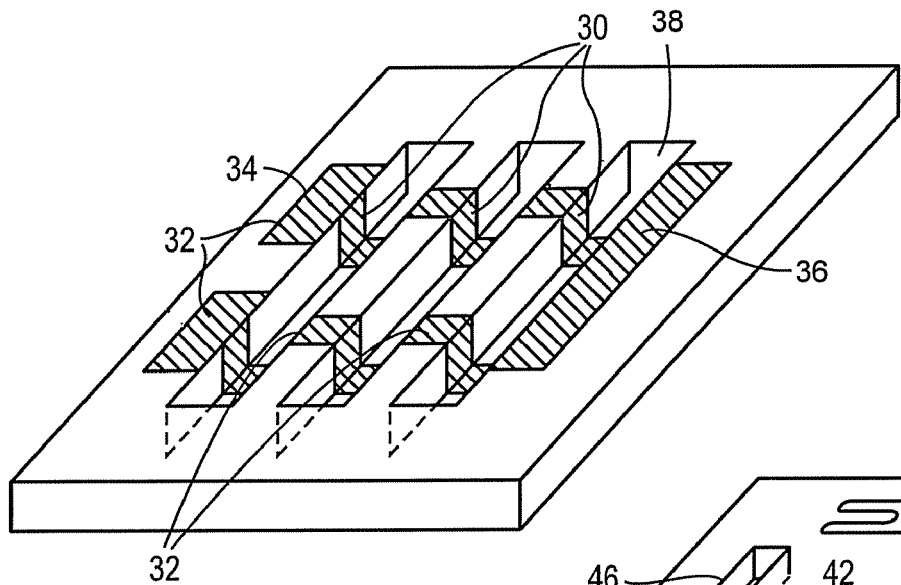
FIG. 3A is an isometric diagram illustrating a chip with a vertical strain gauge implementation.
Figure 3B:
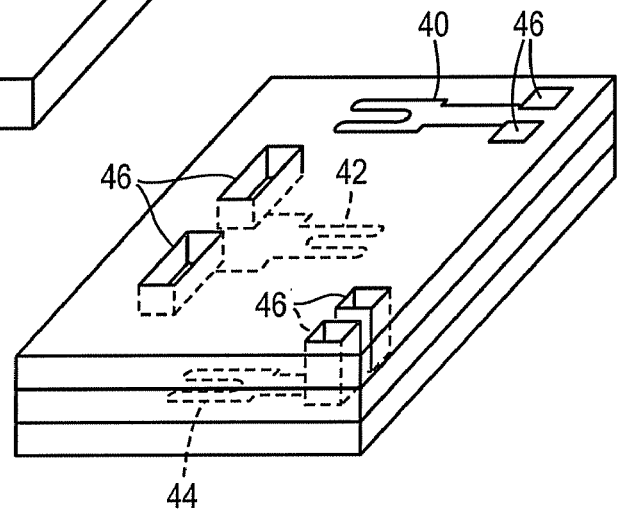
FIG. 3B is an isometric diagram illustrating strain gauges at various layers in a chip.

FIG. 3A illustrates one approach to depositing resistive runs 30 vertically. The areas 32 that lie on the flat surface of the chip are made much broader than the runs 30 that travel vertically into the grooves 38. In this manner a vertical strain will primarily affect the narrowed runs 30, changing the resistance, whereas any strain on the wide, short surface metal depositions 32 will negligibly change the resistance of the entire run from point 34 to point 36. As known in the art, selectively growing dielectric material to form the grooves 38 is well known as is depositing resistive runs. FIG. 3B shows one embodiment in which metal strain gauges may be formed on the surface 40 of the chip; at a first depth 42; and at a second depth 44. Each higher surface is formed, as known in the art, by growing or depositing insulating layers (usually an oxide) where an inventive strain gauge is laid down on each succeeding layer. Contact points coming to the top surface of the chip are formed electrically connecting each strain gauge on each layer to contact pads 46 on the top surface. This may be repeated for more layers than are shown in FIG. 3B so that there is a strain gauge at various depths on buried layers or thin films in a chip. Measurements between the gauges may be made and therefrom a measure of the vertical strain on the chip may be garnered in a manner understood by those skilled in the art.

"Buried layers," "thin film," and "levels" may be used interchangeably referring to surfaces at different depths within a chip where etched conductor runs, contacts and connections to vias may be found.

The layout of strain gauges in FIGS. 1, 2 and 3A, 3B, and 3C illustrate the ability of using the present invention to map the strain on a chip across the top and all the internal layers of a chip. Moreover, the forming of the strain gauges at each layer and vertically between layers is simple and allows direct measurements in three dimensions of the strain throughout the body of a chip.

Figure 3C:
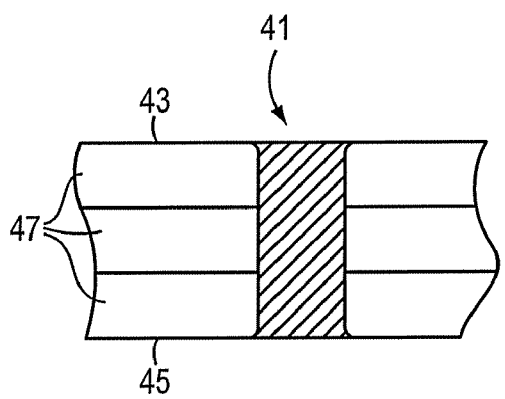
FIG. 3C is a view of a via running from a top surface through two buried layers to a bottom surface.
Figure 3D:
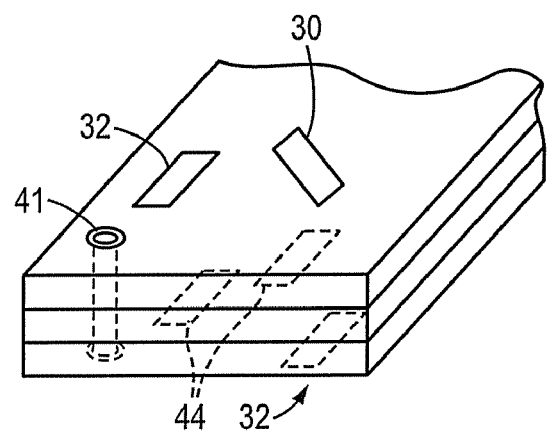
FIG. 3D is an isometric diagram illustrating different strain gauge configurations.

The runs in FIGS. 3A and 3B are preferably in the serpentine pattern of FIG. 1. FIG. 3C illustrates a via 41, which is a plated through hole making an electrical connection from one surface to another. In FIG. 3C, the via 41 runs from a top surface 43 to a bottom surface 45. The via 41 passes buried layers 47 and electrical connections may be made to runs on any of these buried layers or not. Also, the via 41 may terminate at one of the buried layers. FIG. 3D illustrates that resistive strain gauges may comprise: vias 41, buried layer thin films 44, top and bottom surface thin films 32 and vertical thin films 30. In illustrative embodiments, the resistive strain gauge may comprise any of the resistive elements shown in FIGS. 3A, 3B, 3C and 3D, in any combination. Moreover, these resistive strain gauges may be placed anywhere throughout the body of the chip, wherein horizontal or vertical strain may be measured anywhere within the body of the chip.

Metals or other conductive materials used for the strain gauges in accordance with the present invention may be selected from, for example, copper, silver, aluminum (Al), titanium (Ti), tungsten (W), tin and overlays of each other, e.g., Al over TiW. However, higher resistivity combinations like SiCr (silicon/chromium) or polysilicon may be used to advantage. All of these materials are referred to herein as resistive or metallic material.

Figure 4:
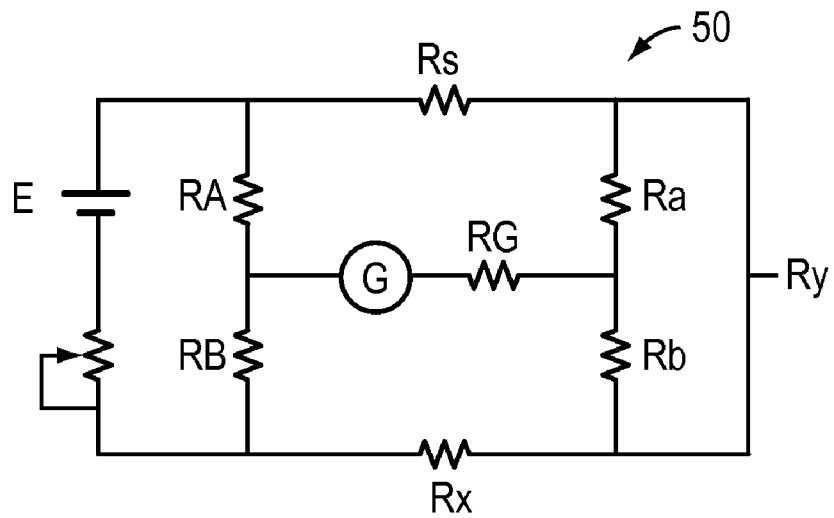
FIG. 4 is an illustrative Kelvin bridge that may be used with the present invention.

FIG. 4 illustrates a Kelvin bridge 50 used for measuring low resistances. Typically the Kelvin bridge is used where contact resistances might interfere with the measurements. Often the resistances being measured with a Kelvin bridge are under one ohm. Other well known measurement bridges, like the Wheatstone et al., may be useful in certain applications. Using these bridges and the corresponding equations are well known in the art.

FIG. 4 includes RA and RB which are the main ratio resistors, Ra and Rb are auxiliary ratio resistors, RX is the unknown strain resistance, RS the standard resistor, and Ry is a low resistance connection between the unknown and the standard resistors that shorts out the Ra and Rb, as one skilled in the art may require. The G is a galvanometer that detects current that represents any change in the RX due to strain resistance changing (assuming the other resistors stay constant). In operation after a stable bias point is established, if RX changes that change will result in an indication on the galvanometer G, and the system may be calibrated so that a change in RX is a measure of strain on the chip.

Figure 5:
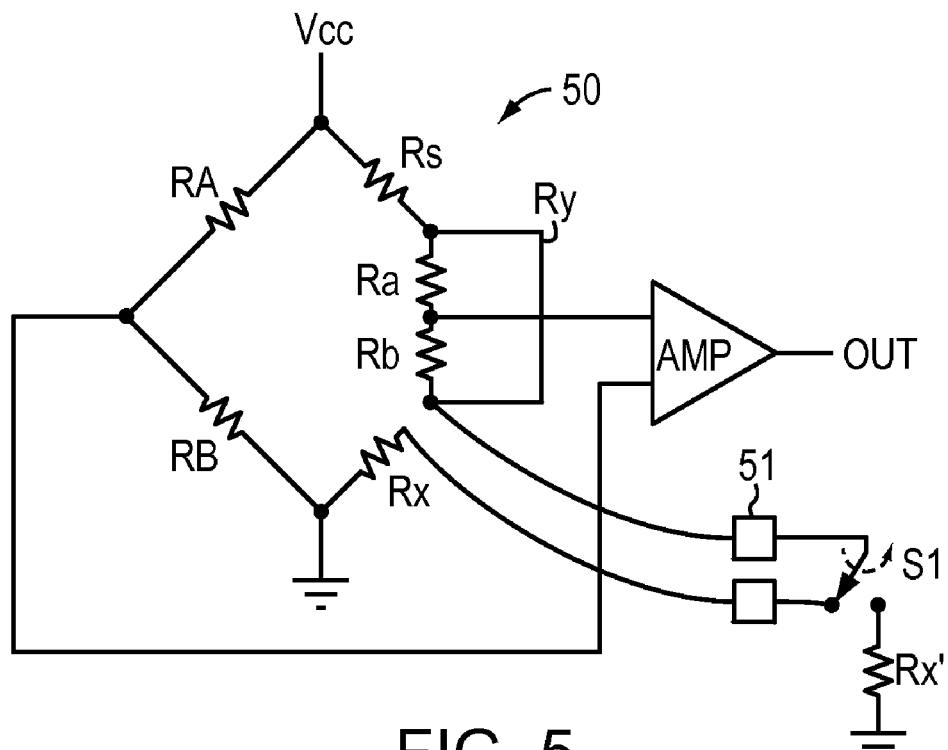
FIG. 5 is a possible circuit used to measure the output of a strain gauge assembly.
Figure 6A:
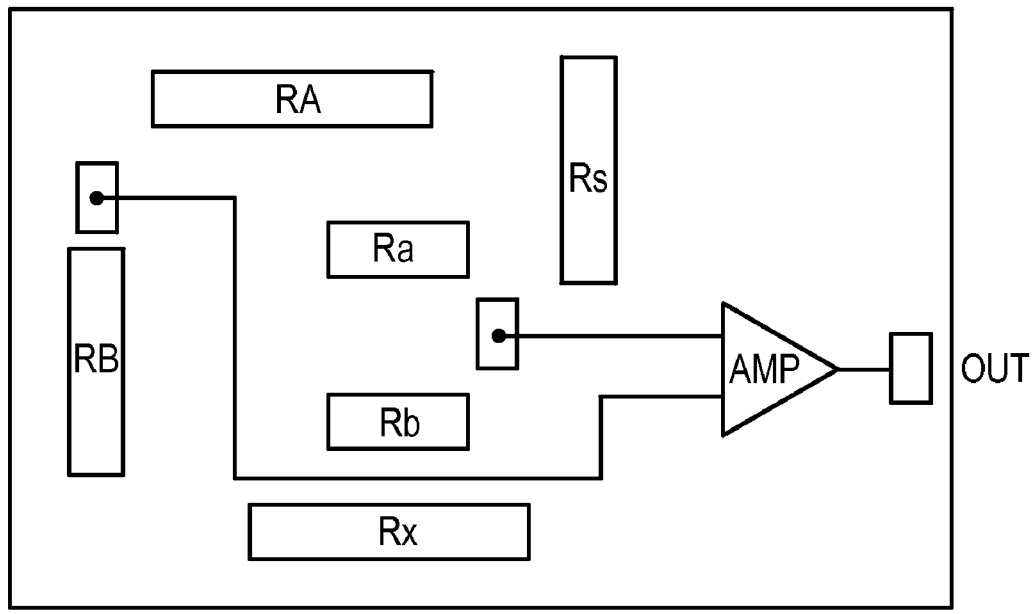
FIG. 6A is a chip with strain gauges and measuring circuitry incorporated into one chip.
Figure 6B:
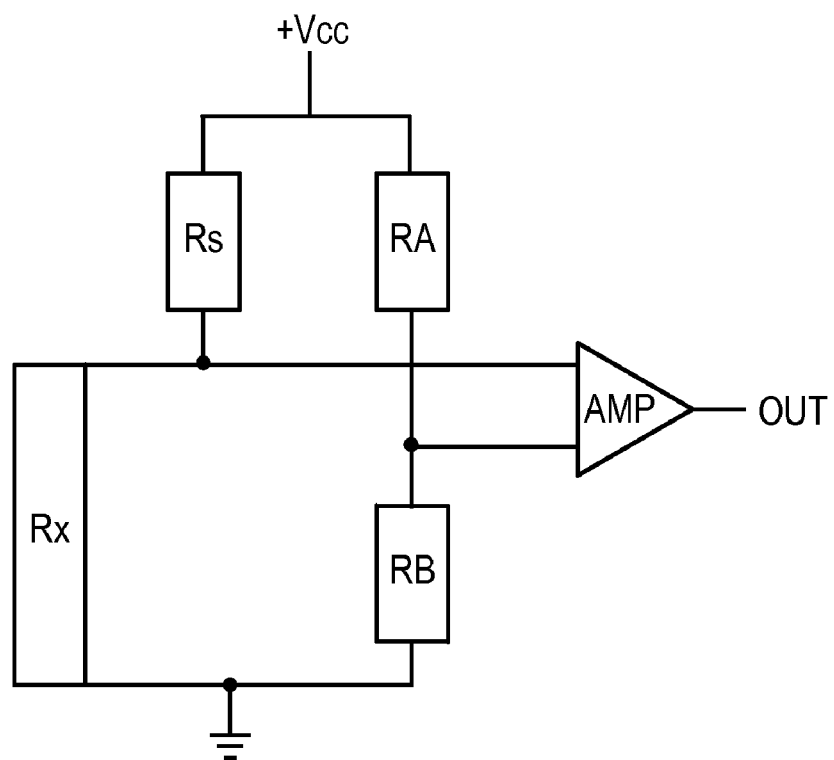
FIG. 6B illustrates the measuring circuitry off the chip.

FIG. 5 illustrates the circuit of FIG. 4 fabricated onto a chip. That is, the strain gauge resistor Rx and all the other resistors are formed on the chip. An amplifier comprised of typical electronic components is fabricated by standard processes onto the same chip. This provides a single chip measuring device. FIG. 6A illustrates a block diagram topical view of the resistors and the amplifier as may be found on a chip. FIG. 6B illustrates that only the resistive strain gauge Rx may be on/in the chip and all the other components may be off the chip, e.g., on printed circuit cards.

When the circuitry including the bridge components are all fabricated onto a single chip, care must be given that the strain measured is substantially that detected only by Rx and that there is no or very little response from the other components. This may be accomplished by fabricating the other components with materials that are unaffected by these other components or by measuring the contribution of these other components and subtracting them from the measurement with Rx. For example in FIG. 5, contact pads 51 may come off the chip. A switch S1 is positioned to disconnect Rx and place Rx' as one leg of the bridge. The chip is stressed (say be heating the chip) and the resulting OUT signals is measured. Then, the switch S1 places Rx as the bridge leg and the measurement retaken. The new result minus the first result is used as the measure of strain at Rx. Other circuitry techniques are known to those skilled in the art and may be used to advantage in the present invention.

The position and relative arrangements of strain gauges and other resistors may be heuristically determined for specific applications.

Figure 7:
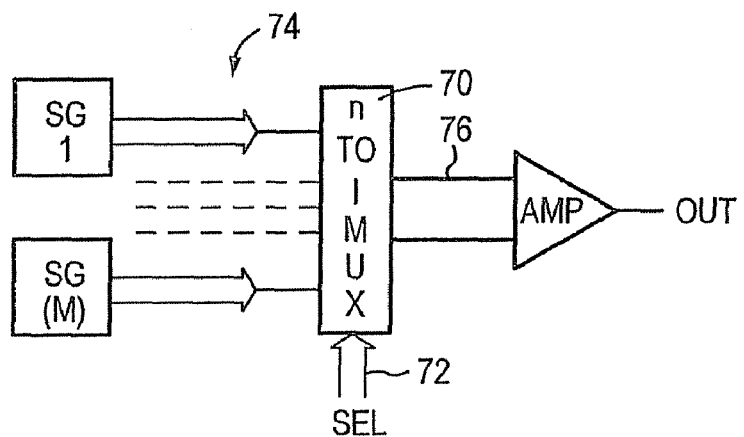
FIG. 7 is a schematic illustrating use of multiplexer to select one of many strain gauges.

FIG. 7 illustrates schematically the use of a multiplexer 70 with electronic signals 72 that select which of the inputs 75 is connected to the output 76 and to an amplifier 78 that presents an output, OUT, that is a measure the strain of the selected strain gauge, SG1 to SG(n).

Figure 8:
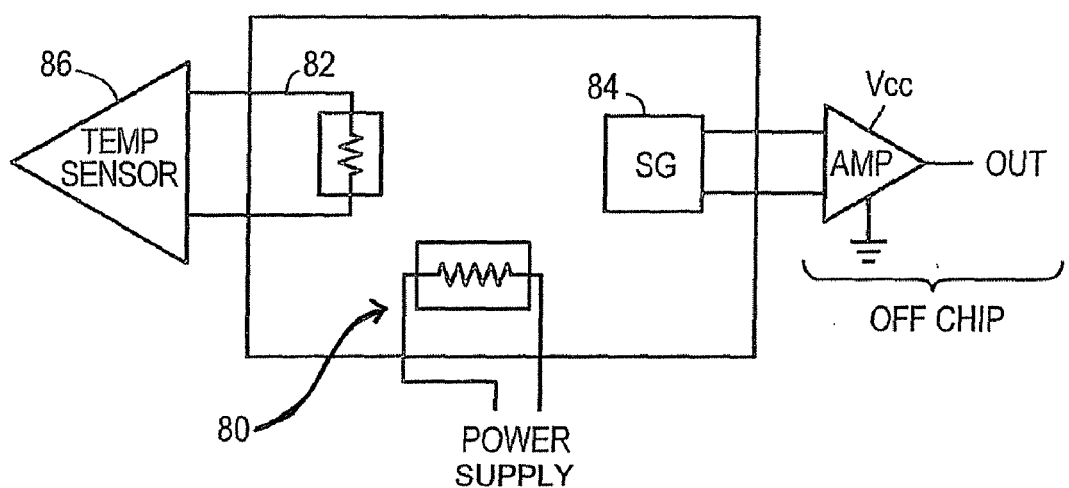
FIG. 8 is a block diagram showing use of a heater and temperature sensor the heat the chip under test.

FIG. 8 illustrates the use of a heater 80, a temperature sensor 82 that connects to electronics 86 for measuring the temperature of the chip. A resistive strain gauge 84, of any type described above, measures thermal strain caused by the heater. Again, the strain may be measured using a multiplexer at any point throughout the body of the chip. In FIG. 8 the amplifier is off the chip, but as described above, it may be on the chip.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A die scale strain gauge system comprising:
a chip having a first surface and a separate, second surface that is buried with respect to the first surface;
a first resistive pattern formed on the first surface, the pattern having two ends, wherein the resistance of the resistive pattern responds to strains on the first surface;
a second resistive pattern formed on the second surface, wherein the second resistive pattern responds to strains on the second surface, and wherein the distribution of the first and the second resistive patterns on the two separate surfaces allows strain to be measured and mapped within the chip; and
at least one resistive vertical pattern is disposed on a vertical surface that extends from an upper surface to a buried surface, wherein the at least one vertical resistive pattern responds to strains experienced by the vertical surface, and wherein strain gauges on the first and second surfaces and the vertical surface allow strain to be measured in three dimensions within the body of the chip.

2. The die scale strain gauge system of claim 1 wherein the at least one vertical resistive pattern comprises a via from an upper surface to a lower surface, and wherein the vertical resistive pattern responds to vertical strains experienced by the vertical surface.

3. The die scale strain gauge system of claim 1 further comprising:
first, second, third, and fourth resistors formed on a surface of the chip, wherein the first and the second resistive patterns and the first, second, third and fourth resistors are electrically interconnected to form a bridge.

4. The die scale strain gauge system of claim 1 wherein the first and second resistive patterns comprise a material selected from the group consisting of copper, aluminum, titanium, tungsten, tin, silicon/chromium, polysilicon, platinum/silicon, tungsten/silicon, aluminum/silicon, and titanium/aluminum, and overlays and combinations thereof.

5. A strain measuring bridge comprising:
a chip having a first surface on or in the chip and at least one or more separate buried surfaces that are vertically displaced in the chip from the first surface;
a resistive pattern formed on the first surface on or in the chip, the pattern extending along the first surface and then vertically to the at least one or more buried surfaces, the pattern defining a first end and a second end;
a standard resistor having a third end and a fourth end, the fourth end connected to the first end;
a first ratio resistor having a fifth end and a sixth end, the sixth end connected to the third end;
a second ratio resistor with a seventh end and an eighth end, the eighth end connected to the fifth end, and where the seventh end is connected to the second end;
a power source coupled between the third end and the second end, and
a detector coupled between the first and the fifth ends, wherein the detector measures the resistance change of the resistive pattern when the chip is subjected to a strain.

6. The strain measuring bridge of claim 5 further wherein only the resistive pattern is on the chip and the other components are constructed off the chip.

7. The strain measuring bridge of claim 5 further comprising a multiplexer arranged between the first and fifth ends and the detector, wherein the multiplexer is constructed with inputs from other strain measuring bridges and with a select input that connects each of the strain measuring bridges to the detector.

8. The strain measuring bridge of claim 7 wherein the chip has other surfaces substantially parallel to the at least one surface, and the chip has vias extending from one surface to another, and wherein the other strain measuring bridges comprise those constructed on the different surfaces of the chip and those using the vias and other vertically arranged resistive elements.

9. The strain measuring bridge of claim 5 further comprising a heater element positioned on or in the chip and a temperature sensor positioned on or in the chip, wherein the heater element, when powered, heats up the chip and the sensor measures the temperature of the chip.

10. The strain gauge measuring bridge of claim 9 wherein the chip is heated and the measuring bridge tracks the resulting strain.

* * * * *